(12) United States Patent
Hulse et al.

(10) Patent No.: US 7,499,967 B2
(45) Date of Patent: Mar. 3, 2009

(54) ACCESS TO WEB SERVICES

(75) Inventors: Brian Hulse, Awbridge (GB); Philip David Rowley, Eastleigh (GB); Christopher Edward Sharp, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 10/552,393

(22) PCT Filed: Mar. 25, 2004

(86) PCT No.: PCT/GB2004/001304

§ 371 (c)(1),
(2), (4) Date: Oct. 7, 2005

(87) PCT Pub. No.: WO2004/090751

PCT Pub. Date: Oct. 21, 2004

(65) Prior Publication Data

US 2006/0195546 A1 Aug. 31, 2006

(30) Foreign Application Priority Data

Apr. 12, 2003 (GB) .................................. 0308522.2

(51) Int. Cl.
*G06F 15/16* (2006.01)
(52) U.S. Cl. ..................................... 709/203; 709/246
(58) Field of Classification Search ................. 709/217, 709/203, 219, 246
See application file for complete search history.

(56) References Cited

U.S. PATENT DOCUMENTS

2003/0061404 A1   3/2003   Chiu et al.
2003/0163450 A1 * 8/2003   Borenstein et al. ............. 707/1
2004/0054969 A1 * 3/2004   Chiang et al. ................ 715/513
2004/0068586 A1 * 4/2004   Xie et al. ..................... 709/246
2004/0181537 A1 * 9/2004   Chawla et al. .............. 707/100
2005/0278417 A1 * 12/2005  Fremantle et al. ........... 709/203

OTHER PUBLICATIONS

Venkatapathy C., et al; "An introduction to Web Services Gateway", Internet, May 1, 2002.
Chan A., et al; "Web Services sub-team report", Internet; URL:http://www.oasys-open.org/committes/ebxml-cppa/documents/presentations>; Jun. 1, 2002.
Medjahed B., et al; "Business-tobusiness interactions: issues and enabling technologies", Internet, URL:http://delivery.acm.org/10.1145/780000/775457/30120059.pdf?key1=775457&key2=6604060011&coll=GUIDE&dl=GUIDE&CFID=313202610&Cftoken=56256904>, Apr. 3, 2003.

(Continued)

*Primary Examiner*—Andrew Caldwell
*Assistant Examiner*—Barak Nissan
(74) *Attorney, Agent, or Firm*—Duke W. Yee; Jill A. Poimboeuf; Cathrine K. Kinslow

(57) ABSTRACT

The present invention provides a method, apparatus and computer program product which enable a web service gateway which provides support for business services which are described using a particular document format, for example Web Service Definition Language (WSDL), to further provide support for business services which are described using a different document format, for example in a business to business (b2b) profile such as specified by RosettaNet. The business service provides its profile to the gateway which generates a document from the profile and then uses the generated document to enable a web client, which recognises the document format but not the profile format, to access the web service via the gateway.

3 Claims, 5 Drawing Sheets

OTHER PUBLICATIONS

Summit Strategies: "Life at the Edge: IBM"s WebSphere Business connection Lowers B2B Process Barriers, Custom Consulting Analysis, URL:http://www-900.ibm.com/cn/software/websphere/products/download/whitepapers/summit-busconn.pdf>, Jun. 1, 2002.

Cutlip R., "Business process integration with IBM CrossWorlds, Part 3: Automatically externalize Web services with SWebSphere Business connection", URL:http://www-106.ibm.com/developerworks/library/i-cross3/>, Jan. 1, 2003.

* cited by examiner

ACCESS TO WEB SERVICES

FIELD OF THE INVENTION

The present invention relates to web services and more particularly to providing access to web services via a web service gateway.

BACKGROUND TO THE INVENTION

Over recent years it has become commonplace for a business to provide a web site on the Internet which, for example, enables a web client to purchase goods from the business over the world wide web. Following on from this success it has more recently become a requirement to handle more complex e-business applications on the Internet which, for example, enable business to business communication and this requirement has been satisfied by the arrival of web services. Web services are modular and enhanced e-business applications that enable programmatic interaction between applications across the Internet.

A web service may, for example, be based on shared, open, and emerging technology standards and protocols, such as SOAP (Simple Object Access Protocol), UDDI (Universal Description, Discovery and Integration), and WSDL (Web Service Definition Language). In this environment web services can communicate, interact, and integrate with heterogeneous applications, irrespective of their implementation formats, thereby enabling web services to interact with one another across the Internet to facilitate dynamic integration between businesses, suppliers, partners, and customers.

For example, a web service which provides an e-business application publishes its URL in a well known UDDI directory. A client can then obtain the URL from the UDDI directory and contact the e-business using the URL in order to obtain a WSDL document. The WSDL describes the interface provided for clients by the service e-business application, one or more transport mechanisms each supporting a communication protocol, for example SOAP over HTTP (HyperText Transport Protocol) and an end point address for each transport mechanism. Once a web client has the WSDL it can invoke the interface via the specified end point using the communication protocol of the specified transport mechanism. Further if the client has an e-business application with which the service e-business application may wish to communicate, the client and service may exchange WSDL documents in order to make this possible. Further, in order to enable clients and web services to communicate when each uses a different communication protocol, a web service gateway is used to transform client requests from one communication protocol to another.

However, whilst many web clients and services have made use of the WSDL documents and a UDDI registry many other web services have made use of other business to business (b2b) protocols, such as those specified, for example, by RosettaNet, cXML, and the Internet Engineering Task Force (AS1 and AS2). These protocols enable business partners using the same b2b protocol to communicate. However it is not currently possible for a WSDL aware web client, which communicates with web services based on WSDL documents, to carry out e-commerce with a business partner which uses these other, non WSDL based, business to business protocols.

SUMMARY OF THE INVENTION

Accordingly, according to a first aspect the present invention provides a method for a web services gateway to enable a web client to access a web service, the method comprising the steps of: receiving a profile from the web service, the profile containing a details of how to communicate with the web service and being in a format not recognisable to the web client; creating a document based on the profile, the document being in a format recognisable to the web client and containing details of how to communicate with the web service via the gateway; and providing, to a third party, information relating to the web service and a location from which the document can be obtained by the web client; thereby enabling the web client to use the document to access the web service via the web service gateway.

According to a second aspect the present invention provides a web services gateway which enables a web client to access to a web service, the gateway comprising: means for receiving a profile from the web service, the profile containing a details of how to communicate with the web service and being in a format not recognisable to the web client; means for creating a document based on the profile, the document being in a format recognisable to the web client and containing details of how to communicate with the web service via the gateway; and means for providing, to a third party, information relating to the web service and a location from which the document can be obtained by the web client; thereby enabling the web client to use the document to access the web service via the web service gateway.

According to a third aspect the present invention provides a computer program product comprising instructions which, when executed on a data processing host, cause the data processing host to carry out the method according to the first aspect.

The third party could, for example, be a UDDI directory although in practice it could be any entity which provides information about web services to web clients.

Optionally the document is created, based on the profile, on receipt of the profile from the web service. Alternatively the document is created only after it is requested by a web client.

Optionally the location at which the document can be obtained which is provided to the third party is in a different web service gateway to the one which generated the document, but which also has access to the document. Alternatively the location, which is provided to the third party, at which the document can be obtained is in the same web service gateway which created it.

Preferably the gateway subsequently receives a request from a web client for the web service. Optionally the request includes details of the document and the gateway uses these details to match the request with the profile of the web service. Alternatively the document created from the profile includes a location in the web service gateway which the client can use to access the web service and which is associated with the profile. As a result the location at which the client request is received can be used to match the request with the profile of the web service. Either way, once the profile is known details from it are used to convert the request to one suitable for sending to the web service and to send the converted request to the web service.

Optionally the gateway may then return to the web client. Alternatively it may wait for a response to the converted request from the web service and then use the response to the converted request to trigger a response to the web client request.

Preferably the document is a Web Services Definition Language (WSDL) document and further could be in any WSDL based format, for example WSDL4J (WSDL for Java) or XLANG (WSDL with extensions). Alternatively the document could be in another definition language, for example CORBA IDL.

Preferably the profile is specified according to the RosettaNet business to business standard. Alternatively it could be, for example, according to other business to business standards such as those specified by cXML, and the Internet Engineering Task Force (AS1 and AS2).

BRIEF DESCRIPTION OF THE DRAWINGS

The invention will now be described, by way of example only, with reference to a preferred embodiment thereof, as illustrated in the accompanying drawings, in which.

Note that in the figures like numbers are used to denote like parts.

DESCRIPTION OF THE PREFERRED EMBODIMENT

Figure 1:
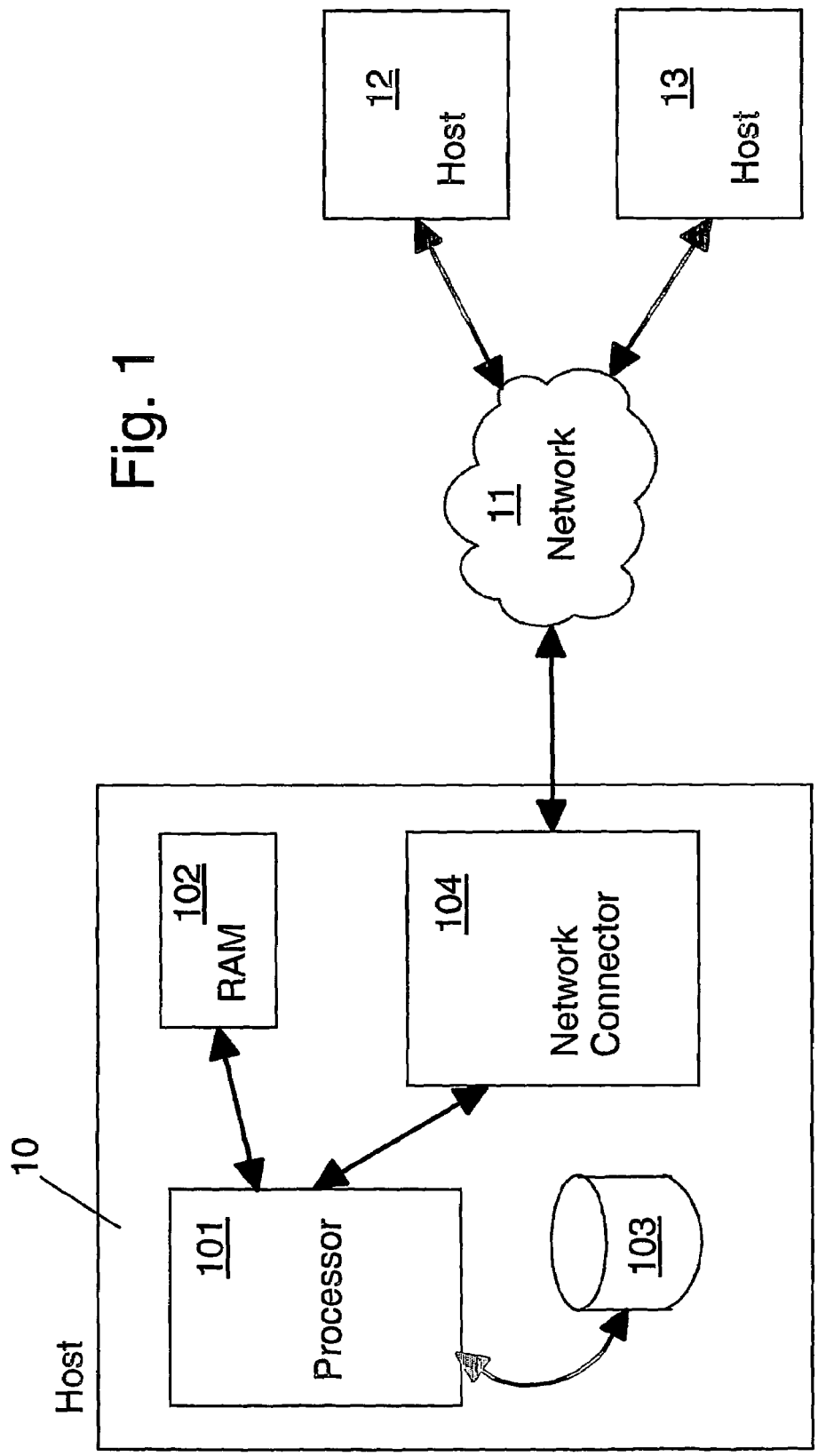
FIG. 1 is a schematic diagram of a data processing environment in which the preferred embodiment of the present invention can be advantageously applied.

FIG. 1 is a block diagram of a data processing environment in which the preferred embodiment of the present invention can be advantageously applied; In FIG. 1, a client/server data processing host 10 is connected to client/server data processing hosts 12 and 13 via a network 11, which could be, for example, the Internet. For example a web client program could be executing on host 10 which is accessing a web service on host 12 via a gateway server on host 13. Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13.

In the preferred embodiment which follows the document describing a web service is a WSDL document. Note that a WSDL document contains details of the web service such as Port Type, Bindings, Ports, Messages, Types etc. The Port Type and messages define the operations and associated parameters provided by the web service, the Bindings specify the communication protocols supported by the web service, and the Ports specify end point addresses for channels providing access to the web service using the communication protocols.

Further note that the preferred embodiment considers a b2b service implemented using the RosettaNet standard b2b protocol. According to RosettNet business partners exchange b2b profiles. A b2b profile includes such information as one or more communication protocols to use for communication with the business, one or more locations at which the business can be contacted, and details of a Partner Information Process (PIP) and an XML Document Type Definition (DTD) which respectively describe the exchange protocols and format of the operations which the business uses. Further the RosettaNet standards specifies many standard PIPs and XML DTDs, for example PIP3A4 and XML DTD3A4, PIP3A4 specifying that a buyer sends a purchase order request operation to the seller and the seller sends a purchase order confirmation operation to the buyer and XML DTD3A4 specifying the format of those operations. As a result, for example, a Book business which sells books may send its b2b profile to one or more business partners which may then use information from the b2b profile in order to purchase books from it. (RosettaNet and PIP are trademarks of the RosettaNet organisation).

Figure 2:
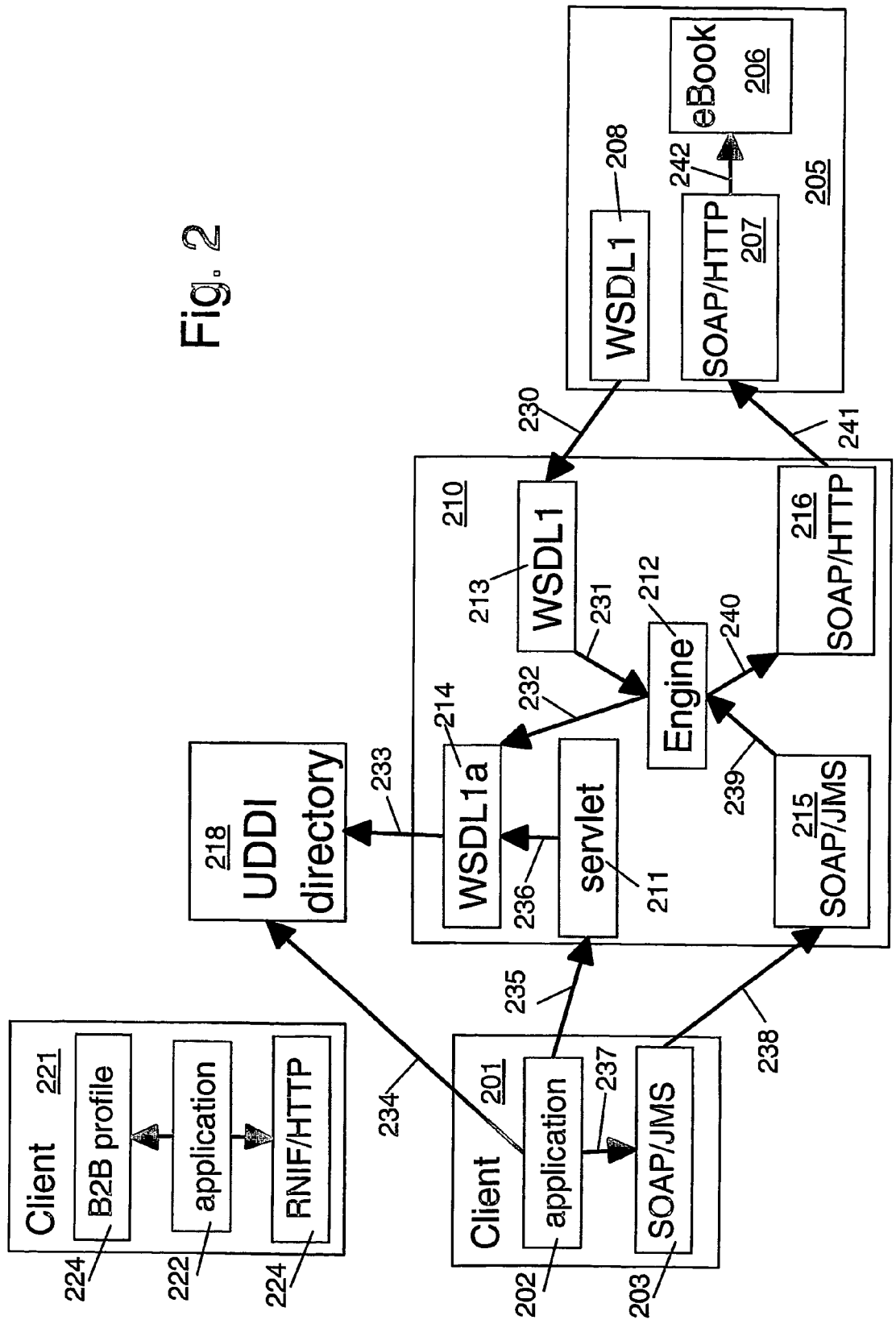
FIG. 2 is a schematic diagram of an example web client sending a request to a web service through a gateway based on use of a UDDI registry and WSDL documents according to the prior art.

FIG. 2 is a schematic diagram of an example of a WSDL aware web client 201 sending a request to a web service 206, herein denoted "eBook", through a gateway 210 based on the use of a UDDI registry 218 and WSDL documents 208, 213, and 214, according to the prior art. The eBook service 206 is available from a target server 205 which has a channel 207 which supports communication using a communication protocol of SOAP over HTTP. The eBook service provides the ability to purchase books using a purchase order request from a client to whom the eBook service sends a purchase order confirmation. Details of the eBook service are described in a WSDL document WSDL1 208 which specifies Port Types and Messages which define the operations of PurchaseOrderRequest( ) and PurchaseOrderResponse( ), bindings and port for the channel 207 which specify a communication protocol of SOAP/HTTP, and an end point address of the channel through which the service can be contacted. The target server 205 provides (230) WSDL1 208 to the gateway 210 which saves a copy as WSDL1 213. In the gateway WSDL1 213 is passed (231) to the gateway engine 212 which, for example, changes the binding and port of the eBook service channel to those provided by the gateway, thereby producing (232) an new WSDL, WSDL1a 214. In this example the gateway has two channels, a SOAP/Java Message Service (JMS) channel 215 and a SOAP/HTTP channel 216 (Java is a registered trademark of Sun Microsystems Inc.). The gateway then registers (233) the eBook service with a known UDDI directory 218 by providing to the UDDI directory the type of the service and the URL of the servlet 211 from which a client can obtain a copy of the modified WSDL, WSDL1a 214. The UDDI directory may be known to the gateway, for example, through configuration information.

A web client process 201 is running an application 202 which wishes to access the eBook service. The client process includes a channel 203 which provides a transport mechanism of SOAP over JMS. The application first accesses (234) the UDDI directory 218 to obtain details of a book service and in return receives details of the URL of the servlet 211 in the gateway 210 from which the modified WSDL, WSDL1a 214, of the eBook service can be obtained. The client application 202 then requests (235) the WSDL document describing the eBook service from the servlet 211. As a result of this request the servlet 211 obtains (236) WSDL1a 214 and returns it to the client application. Then, based on this document, the client application requests the PurchaseOrderRequest ( ) operation of the eBook service as specified in the Port Type of the WSDL document using a communication protocol of SOAP/JMS as specified in the bindings of the WSDL document and directing the request to the end point address of the SOAP/JMS communication channel as specified as a Port in the WSDL document. To make the request the client application 202 passes (237) the request to SOAP/JMS channel 203 in the client process which then forwards it (238) to the SOAP/JMS channel 215 in the gateway server 210.

When the SOAP/JMS channel 215 of the gateway 210 receives this request it passes (239) the request to the gateway engine. The request includes details of the WSDL document, WSDL1a 214, which the client application used to make the request, and based on this information the gateway engine discovers the original WSDL, WSDL1 213, which was used to create WSDL1a. From WSDL1 the gateway engine then obtains the bindings and port for the eBook service and as a result passes the request to the SOAP/HTTP channel 216 of the gateway server giving details of the SOAP/HTTP channel 207 of the eBook server. The SOAP/HTTP channel 216 then sends (241) the request to the SOAP/HTTP channel 207 of the eBook server 205 which then passes (242) it on to the eBook service 206.

FIG. 2 also shows a second service 221, herein denoted "aBook", which provides the same operations as the eBook service 206 but is implemented according to RosettaNet standards. As a result, according to the prior art, it cannot be accessed by the WSDL aware web client 201, either directly or via the gateway server 210, as the b2b profile is not recognisable to either the web client 201 and gateway server 210 which require a WSDL document, whereas the aBook service 221 is a b2b service which is only described in a non-WSDL b2b profile 223.

Figure 3:
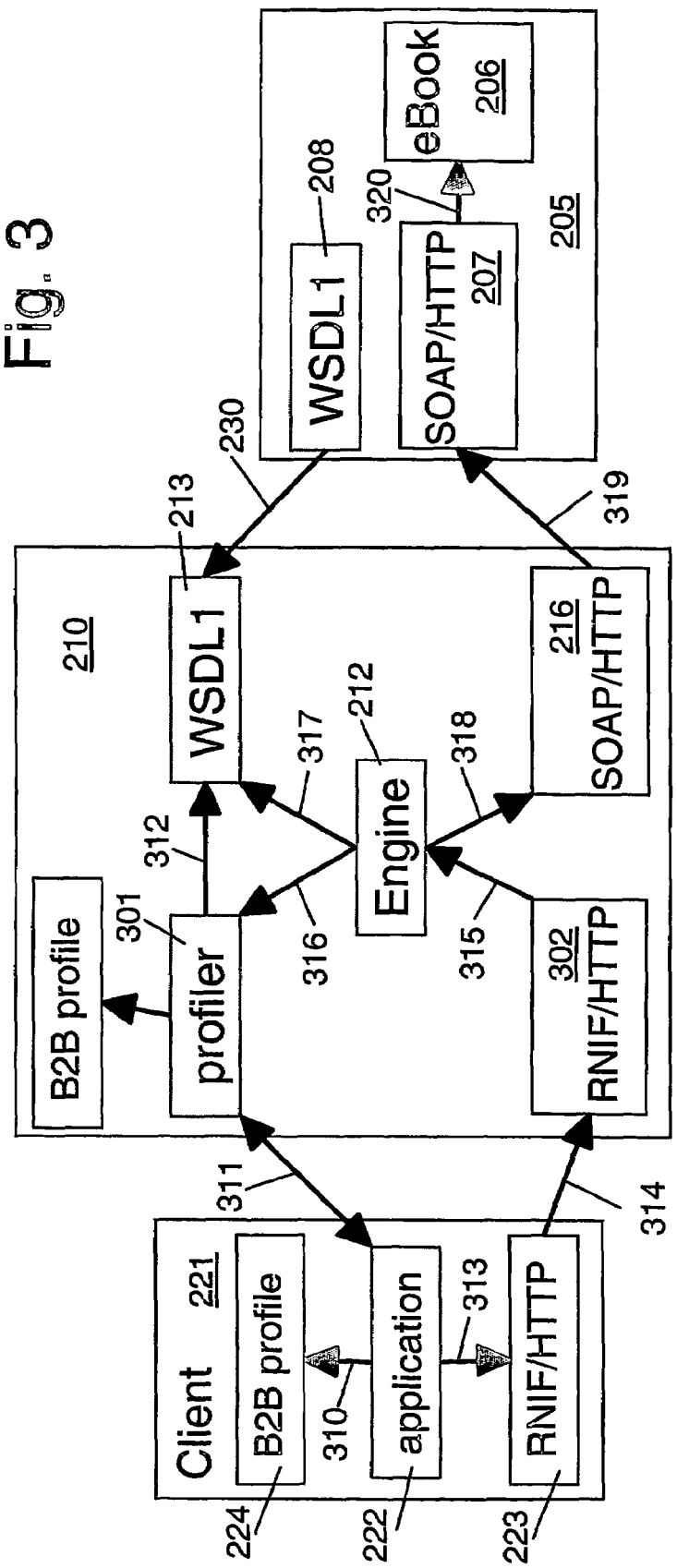
FIG. 3 is a schematic diagram of an example of a web client sending a request to a b2b service through a gateway based on use of a UDDI registry and WSDL documents where the b2b service is implemented to RosettaNet standards.

FIG. 3 is a schematic diagram of an example of the WSDL aware web client 201 of FIG. 2 sending a request to the aBook service 221 through a gateway 210 based on use of UDDI directory 218 and a WSDL document, WSDLb2b 302, where the aBook service 221 is implemented to RosettaNet standards, according to the preferred embodiment of the present invention. Note that in FIG. 3, where common reference numerals are used with FIG. 2, the associated function is the same as in FIG. 2. The aBook service 221 is available from a target server 220 which has a channel 222 which supports communication using a transport mechanism of RosettaNet Implementation Framework (RNIF) over HTTP. The aBook service provides the ability to purchase books using a purchase order request operation and a purchase order confirmation operation. Details of the aBook service are described in a b2b profile 223, which contains details of a Partner Interface Process (PIP) and XML Document Type Definition (DTD), one or more communication protocols which it supports, and one or more end point addresses at which the business can be contacted. In this example the b2b profile 223 contains details of PIP3A4 and XML DTD3A4, the RNIF/HTTP channel 222 and an end point address for the RNIF channel. PIP3A4 contains details an exchange protocol which says that the buyer sends a purchase order request operation to the seller and the seller sends a purchase order confirmation operation to the buyer, and XML DTD3A4 contains the data form of the purchase order request and purchase order confirmation operations.

The aBook server 220 provides its b2b profile 223 to business partners with which it wishes to operate and in this example sends (311) its profile to a profiler 301 in the gateway server 210. The profiler 301 then saves a copy 303 of the b2b profile 223 and uses information from it to create (312) a WSDL document WSDLb2b 302 which contains details of the operations supported by the aBook service and bindings and port for the channels supported by the gateway. In this example the WSDL contains details of the purchase order request and purchase order confirmation operations and the SOAP/JMS and RNIF/HTTP channels, 215 and 304, supported by the gateway server 210. The gateway then registers (313) the aBook service with a known UDDI registry 218 by providing to the UDDI registry the type of the service and the URL of the servlet 211 from which a client can obtain a copy of the WSDL, WSDLb2b 302.

The web client process which, in this embodiment, sends a request to the ebook service works in the same way as in FIG. 2, the only difference being the WSDL document which is returned to the client application request (235) to servlet 211. Accordingly the client sends (238) a purchase order request operation to the SOAP/JMS channel 215 of the gateway server.

When the SOAP/JMS channel 215 of the gateway 210 receives this request it passes (239) the request to the gateway engine 212. The request includes details of the WSDL document, WSDLb2b 302, which the client application used to make the request. The gateway engine then passes (315) this information to the profiler 301 which finds (318) the b2b profile copy 303 from which the WSDL document was created and returns details from it to the gateway engine 212. The details include the location of the aBook service 221 and the protocol to be used in sending requests to it. As a result the gateway engine transforms the client request from a SOAP/JMS request to an RNIF/HTTP request and then provides it to the RNIF/HTTP channel 304 which sends (317) it to the aBook service 221 via the RNIF/HTTP channel 222 of the aBook server 220. When the request is received by the RNIF/HTTP channel it forwards (318) it to the aBook service 221 which does not know that it did not come directly from the client application 202.

In summary, according to the embodiment of FIG. 3, for a business which is implemented to RosettaNet standards service, the business provides its b2b profile to the gateway. The profile contains details of a PIP and an XML DTD (which contain details of the exchange protocols and operations supported by the business), the communication protocols which it supports and the address at which the business can be contacted. For example it may publish a B2B profile containing details of PIP3A4, XML DTD3A4 and RNIF/HTTP. PIP3A4 contains details of a purchase order exchange protocol which a says that the buyer sends a purchase order request and the seller sends a purchase order confirmation and XML DTD3A4 contains details of the format of the purchase order request and confirmation operations. The gateway has a "profiler" which receives the b2b profile and creates a WSDL document based on the details contained in the b2b profile. A client then gets the WSDL and sends a purchase order request to the gateway, the gateway receives the request which includes details of the WSDL it obtained to make the request. A gateway engine then intercepts the request and asks the profiler for details of the address of the business service to send to the request to, which the profiler gets from the b2b profile used to generate the WSDL. The request is then forwarded to the web service using the communication protocol specified in the b2b profile.

Note that according to PIP3A4 after receiving a purchase order request a business partner first sends a receipt acknowledgement signal to the client business partner. This is then followed by a purchase order confirmation to which the client business partner responds with a receipt acknowledgement signal. This can be achieved using normal processing as the request sent from client SOAP/JMS channel 203 to the gateway SOAP/JMS channel 215, and from the gateway RNIF/HTTP channel 304 to the target business RNIF/HTTP channel 222, will include return addresses. These flows can be done asynchronously or synchronously for the client and/or the target service. For example if a client sends a synchronous purchase order request (for example using SOAP/HTTP instead of SOAP/JMS) to the gateway and wishes to receive the receipt acknowledgement signal as a synchronous response, the gateway can hold the thread used to process the client request and use the receipt acknowledgement from the aBook service as a trigger to release the thread and return to the client.

Note that whilst the preferred embodiment has been discussed in terms of PIP3A4 and XML DTD3A4 which relate to requesting a purchase order there are many other PIPs and associated XML DTDs which are defined by the RosettaNet standard which could alternatively be used. For example PIP1A1 and XML DTD3A1 for requesting account set-up, PIP1B2 and XML DTD1B2 for requesting Authorisation status, PIP2A1 and XML DTD2A1 to distribute new product information etc.

Further note that whilst the preferred embodiment has been discussed in terms of a b2b service which provides a b2b profile according to the RosettaNet standard, alternatively the b2b service could provide a b2b profile or equivalent according to any other standard such as this specified by cXML, and the Internet Engineering Task Force (AS1 and AS2). According to the invention the requirement of the b2b service is to provide to the gateway sufficient information (in a non-WSDL format) for the gateway to build a WSDL document describing the service. Sufficient information comprises details of the interface supported by the b2b client or service and a communication protocol and address to use when communicating with it.

Further note that whilst the preferred embodiment describes use of SOAP/JMS, SOAP/HTTP and RNIF/HTTP channels by the gateway server, in another embodiment one or more of these channels may be omitted and/or replaced and/or added to. For example other additional/alternative channels could provide communication using, for example, Internet Inter-Orb Protocol (IIOP), IIOP Secure (IIOPS), HTTP, HTTP Secure (HTTPS), SOAP over JMS, Remote Method Invocation (RMI) over IIOP, XML over JMS, SOAP over Simple Mail Transfer Protocol (SMTP), or Enterprise JavaBean (JavaBeans is a registered trademark of Sun Microsystems Inc.).

Further note that the gateway of the preferred embodiment comprises a servlet 211, engine 212, and profiler 301. However, a skilled person would be aware that the functionality provided by these components could easily be distributed amongst fewer or more components and conceptually are provided by a single component which is the gateway 210.

Figure 4:
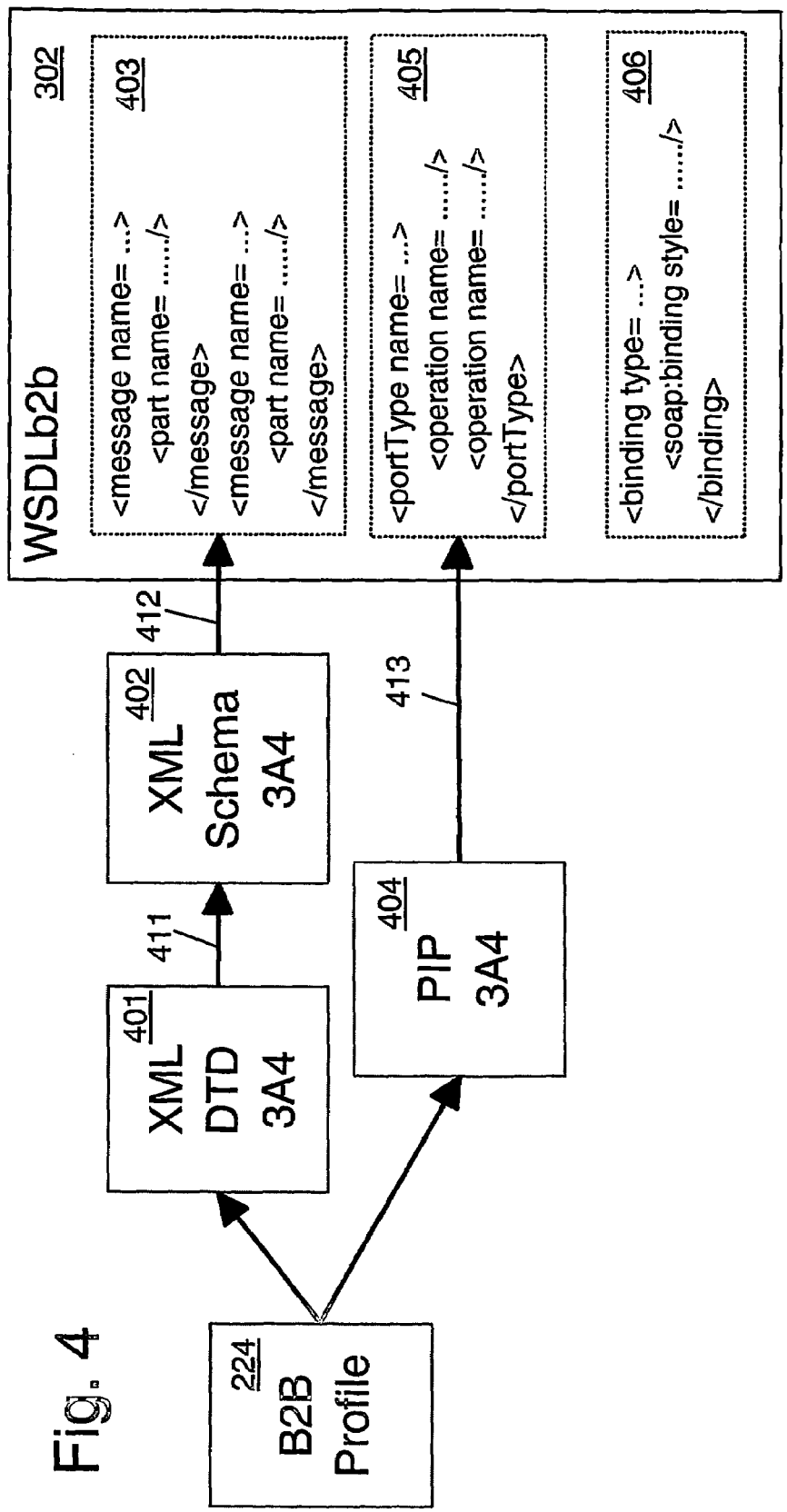
FIG. 4 is a schematic diagram of generating a WSDL document to represent a b2b service based on a b2b profile provided by the service according to RosettaNet standards.

FIG. 4 shows how, according to the preferred embodiment of the present invention, WSDLb2b (302) is created based on a B2B Profile (303) received from a b2b service and a gateway channels profile (406). The b2b profile (303) contains details of a Partner Information Process (PIP) and an XML Document Type Definition (DTD) which specify the services provided by the b2b service. In this example the b2b profile contains details of PIP3A4 and XML DTD3A4 which define the exchange protocols and format of the messages (operations) which are used in the exchange protocol, respectively. The gateway uses this information to obtain XML DTD3A4 (401) and PIP3A4 (404) which are publicly available documents and therefore not necessary to include directly in the b2b profile (303). XMD DTD3A4 is first converted (411) into an XML Schema (402) using a standard tool, for example Extensible Stylesheet Language Translation (XSLT), and then information from the XML Schema (402) relating to the format of the operations (messages) is transformed and copied (412) into a section (403) of the WSDL document (302) which describes the format of the messages supported by the service. Information in PIP3A4 (404) is then transformed and copied (413) into a section (405) of the WSDL document (302) which describes the operations and associated exchange protocols supported by the service. Finally information relating to channels available in the gateway, for example channels 215 and 304 of FIG. 3, are added (414, 415) sections (407, 408) to the WSDL document (302) each of which specify the bindings for a channel in the gateway through which the service can be contacted.

Figure 5B:
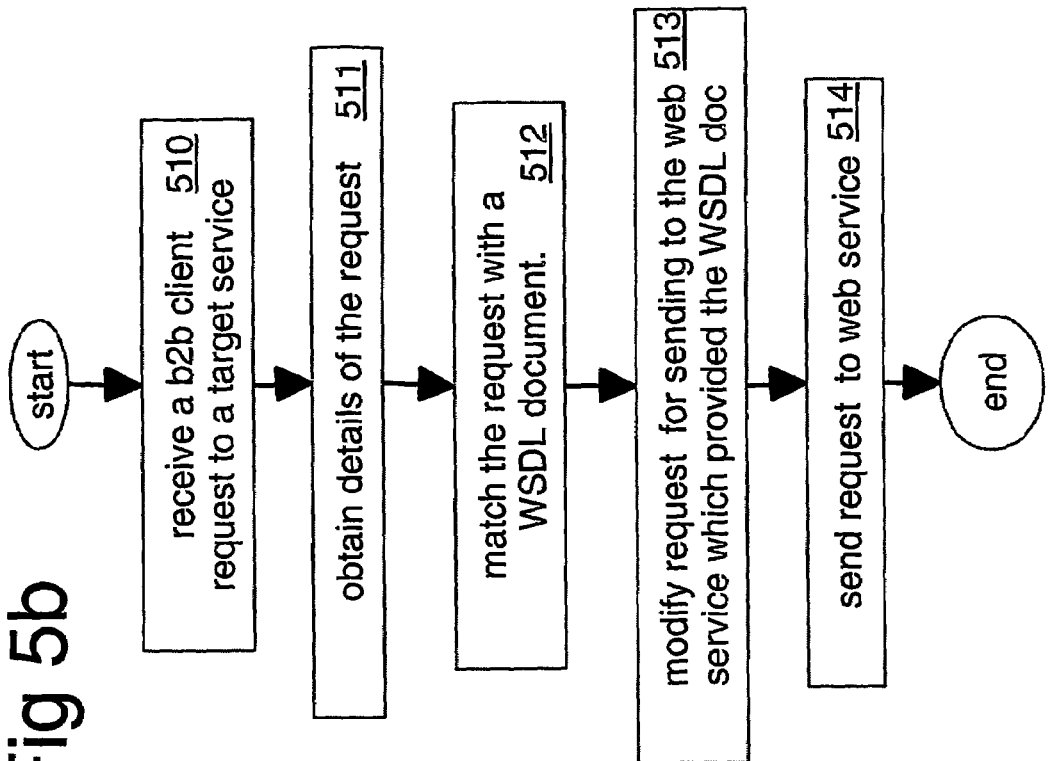
FIG. 5b is a flow diagram of the method followed by a gateway server on receipt of a request from a web client for a b2b service.
Figure 5A:
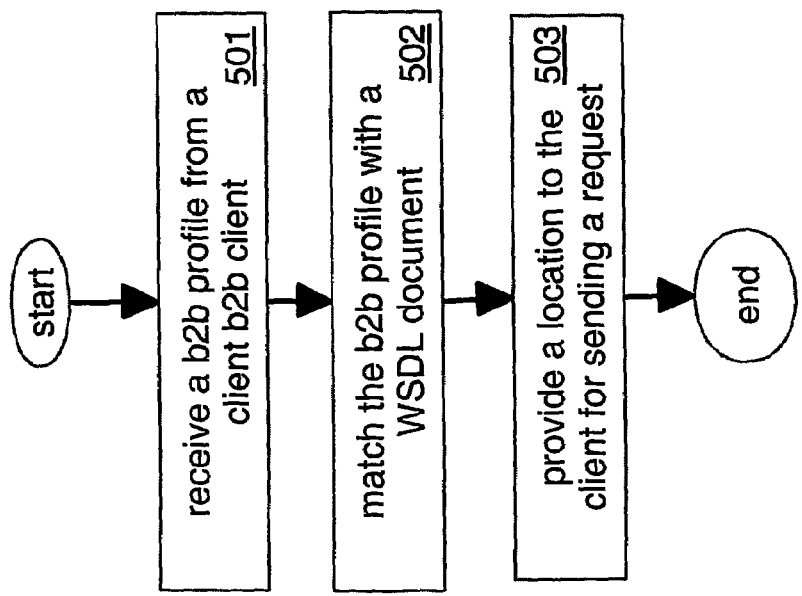
FIG. 5a is a flow diagram of the method followed by a gateway server on receipt of a b2b profile from a b2b service.

FIG. 5a is a flow diagram of the method followed by a gateway server on receipt of a b2b profile from a b2b service, for example, with reference to FIG. 3, the method of the profiler 301 on receipt of the b2b profile 223 from the aBook server 220. At step 501 the gateway receives (311 of FIG. 3) the b2b profile from the b2b service and at step 502 the b2b profile received is used to generate (312 of FIG. 3) a WSDL document, for example, using a method as illustrated in FIG. 4. The WSDL document describes the interfaces provided by the b2b service and the address of channels to which requests can be sent to the gateway server and details of and the protocols the channels support. Finally at step 503 the gateway provides (313 of FIG. 3) to a UDDI registry details of the b2b service and a location in the gateway from which the WSDL can be obtained. The details of the b2b service provided to the UDDI registry may then be used by a web client to identify a service which it wishes to use and may, for example, include details of the web service such as the type of goods sold.

FIG. 5b is a flow diagram of the method followed by a gateway server on receipt of a request from a web client for a b2b service, for example, with reference to FIG. 3, the method of the channels 215 and 304, gateway engine 212, and profiler 301 on receipt (238) of a request from a client application 202 for a the aBook service 221. At step 510 the request is received (238 of FIG. 3) by the gateway via one of the channels it supports and at step 511 details of the WSDL document that was provided to the client for making the request are obtained from the request. At step 512 the WSDL document identified is matched (318 of FIG. 3) with the b2b profile used to generate it, for example at step 502 of FIG. 5a. Once the b2b profile has been identified information relating to the location of the b2b service and the protocols which it supports are obtained from it and then, at step 513, this information is used to modify the request for sending to the b2b service, for example by changing the protocol from SOAP/JMS to RNIF/HTTP. However, note that the protocols used by the client and target service may be the same in which case the protocol used for the request need not be modified. Finally at step 514 the request is forwarded (317 of FIG. 3) to the b2b service at the location specified in the b2b profile. Thus a web client request based on a WSDL document has been received, modified and forwarded to a b2b service which is specified in a non-WSDL b2b profile.

Note, alternatively at step 502 of FIG. 5a the address of the channels to which request can be sent can be associated with the b2b profile used to create the WSDL document. As a result steps 511 and 512 of FIG. 4b would not be required as the b2b profile could be obtained based on the location at which the request is received.

Further note, step 502 need not be carried out after receipt of the b2b profile at step 501 and before providing details of the WSDL to a UDDI registry at step 503. Alternatively the WSDL can be created on receipt of a request from a client for a copy of the WSDL, for example on receipt of request 235 of FIG. 3 (not shown in FIGS. 5a and 5b).

Note that a skilled person would realise that the methods described in FIGS. 5a and 5b could be implemented in a variety of programming languages, for example, Java, C, and C++. Further a skilled person would realise that once implemented the methods can be stored in a computer program product comprising or more programs, in source or executable form, on a media, such as floppy disk, CD, and DVD, suitable for loading onto a data processing host and causing the data processing host to carry out the methods.

The present invention provides a method, apparatus and computer program product which enable a web service gateway which provides support for business services which are described using a particular document format, for example Web Service Definition Language (WSDL), to further provide support for business services which are described using a different document format, for example in a business to business (b2b) profile such as specified by RosettaNet. The business service provides its profile to the gateway which generates a document from the profile and then uses the generated document to enable a web client, which recognises the document format but not the profile format, to access the web service via the gateway.

The invention claimed is:

1. A method for a web services gateway to enable a web client to access a web service, the method comprising the steps of:
   receiving, by a profiler in the web services gateway, a b2b profile from the web service, the b2b profile containing details of how to communicate with the web service and being in a format not recognisable to the web client;
   creating, by the profiler in the web services gateway, a WSDL document based on the b2b profile, the WSDL document being in a format recognisable to the web client and containing details of how to communicate with the web service via the gateway; and
   providing, to a third party, information relating to the web service and a location from which the WSDL document can be obtained by the web client;
   thereby enabling the web client to use the WSDL document to access the web service via the web service gateway; and
   wherein the details of how to communicate with the web service via the gateway include a RNIF/HTTP channel address in the gateway for the client to use when requesting to access the web service, the RNIF/HTTP gateway channel address being associated with the b2b profile and the method further comprises the steps of:
   receiving a request, at the RNIF/HTTP gateway channel address, from the web client for the web service;
   obtaining details from the b2b profile associated with the RNIF/HTTP gateway channel address and using the details to convert the request into a request suitable for sending to the web service; and
   sending the converted request to the web service.

2. A method according to claim 1 comprising the further steps of:
   receiving a request from the web client for the web service, the request including details of the WSDL document;
   using the details of the WSDL document to match the request with the b2b profile received from the web service;
   using details from the b2b profile to convert the request to a request suitable for sending to the web service; and
   sending the converted request to the web service.

3. A method according to claim 2 comprising the further steps:
   waiting for a response to the converted request from the web service; and
   using the response to the converted request to trigger a response to the web client request.

* * * * *